United States Patent
Charlet et al.

(10) Patent No.: US 7,177,073 B2
(45) Date of Patent: Feb. 13, 2007

(54) MULTIPLE ORDER RAMAN AMPLIFIER

(75) Inventors: Gabriel Charlet, Villiers-le-Bacle (FR); Patrice Tran, Aubervilliers (FR)

(73) Assignee: Alcatel, Paris (FR)

( * ) Notice: Subject to any disclaimer, the term of this patent is extended or adjusted under 35 U.S.C. 154(b) by 124 days.

(21) Appl. No.: 10/951,599

(22) Filed: Sep. 29, 2004

(65) Prior Publication Data

US 2005/0105166 A1    May 19, 2005

(30) Foreign Application Priority Data

Nov. 14, 2003    (EP)    ................................. 03292843

(51) Int. Cl.
*H01S 3/00*    (2006.01)

(52) U.S. Cl. .................. 359/334; 359/341.32

(58) Field of Classification Search ........... 359/341.32, 359/334

See application file for complete search history.

(56) References Cited

U.S. PATENT DOCUMENTS

| | | | | |
|---|---|---|---|---|
| 5,253,104 | A | * | 10/1993 | Delavaux ................ 359/341.33 |
| 5,430,572 | A | * | 7/1995 | DiGiovanni et al. ... 359/341.33 |
| 6,163,636 | A | | 12/2000 | Stentz et al. |
| 6,204,960 | B1 | | 3/2001 | Desurvire |
| 6,480,326 | B2 | * | 11/2002 | Papernyi et al. ............. 359/334 |
| 6,519,078 | B2 | * | 2/2003 | Miyakawa et al. ......... 359/334 |
| 6,693,740 | B2 | * | 2/2004 | Gray et al. ............... 359/337.4 |
| 6,700,696 | B2 | * | 3/2004 | Dominic et al. ........ 359/341.32 |
| 6,714,342 | B2 | * | 3/2004 | Islam et al. .................. 359/334 |
| 6,782,151 | B2 | * | 8/2004 | Sasaoka et al. ................ 385/15 |
| 6,813,067 | B1 | * | 11/2004 | Birk et al. .................... 359/334 |
| 7,038,839 | B1 | * | 5/2006 | Akasaka ...................... 359/334 |
| 2002/0063948 | A1 | | 5/2002 | Islam et al. |
| 2003/0174938 | A1 | * | 9/2003 | Headley et al. ................ 385/27 |
| 2004/0141226 | A1 | * | 7/2004 | Mongardien et al. ....... 359/334 |

OTHER PUBLICATIONS

Chestnut D A et al: "Copropagating and Counterpropagating Pumps in Second-Order-Pumped Discrete Fiber Raman Amplifiers" Optics Letters, Optical Society of America, Washington, US, vol. 27, No. 19, Oct. 1, 2002, pp. 1708-1710.

* cited by examiner

Primary Examiner—Jack Keith
(74) Attorney, Agent, or Firm—Sughrue Mion, PLLC

(57) ABSTRACT

A Raman amplifier for use in an optical fiber communication system with dispersion compensation has a first order Raman pump source and a second order Raman pump source both coupled to the input ports of a four-port optical coupler having two input ports and two output ports. One output port is connected to an optical fiber length to inject a pump light signal into the fiber length for second-order Raman amplification and the other output port is connected to a dispersion compensating fiber.

7 Claims, 1 Drawing Sheet

MULTIPLE ORDER RAMAN AMPLIFIER

TECHNICAL FIELD

The invention relates to the field of optical fiber communication systems and more particularly to a Raman amplifier that employs multiple order pumping. The invention is based on a priority application EP 03 292 843.4 which is hereby incorporated by reference.

BACKGROUND OF THE INVENTION

In optical fiber communication systems, optical signals propagating along an optical fiber undergo signal attenuation due to absorption and scattering in optical fibers. Therefore, optical signals require periodic amplification over long distances, which can be performed either by electrical repeaters or by optical amplifiers. Known optical amplifier types include Erbium-doped fiber amplifiers (EDFAs), semiconductor optical amplifiers and Raman amplifiers. Due to its low noise figure and its flat gain over a wide signal wavelength band, the Raman amplifier has gained increasing attention in the recent past as ideal amplifier candidate for use in wavelength division multiplex (WDM) signal transmission.

The Raman amplification process is based on the Raman effect, which is a non-linear optical process that occurs only at high optical intensities and involves coupling of light propagating through the non-linear medium to vibrational modes of the medium, and re-radiation of the light at a different wavelength. Re-radiated light upshifted in wavelength is commonly referred to as a Stokes line, whereas light downshifted in wavelength is referred to as an Anti-Stokes line. The Raman effect is described by quantum mechanics as scattering of photons at molecules which thereby undergo a transition of their vibrational state. Raman amplification involves stimulated Raman scattering, where the incident beam, having a higher optical frequency, often referred to as the pump beam, is used to amplify the lower frequency beam often referred to as the Stokes beam or the signal beam through the Raman effect.

In a silica fiber for example, the strongest Raman scattering, i.e. the maximum Raman gain occurs at a frequency shift of about 13.2 THz, which corresponds to a wavelength shift of about 50–100 nm for pump wavelengths between about 1 and 1.5 μm. A pumping scheme, where the pump beam is detuned from the signal beam by one Stokes shift is referred to as first-order pumping. First order pumping has, however, some limitations. The pump signal power launched into the fiber link will decrease exponentially with the distance as the light propagates into the fiber, which means that regardless of how powerfull the pump, most of the amplification will occur relatively near the point where the pump is injected into the fiber. This limits the improvement in the optical signal-to-noise ratio (OSNR) that the Raman amplifier can induce. Moreover, as the pump power is increased, Rayleigh scattering of the signal limits also the improvement in the OSNR.

A second-order pumping scheme has therefore been recently proposed, where a relatively strong second order pump beam, detuned by two Stokes shifts from the signal beam, is used to amplify a first order pumping beam which in turn serves to amplify the signal beam. U.S. Pat. No. 6,163,636 for example discloses an optical fiber communication system with one or more multiple-order Raman amplifiers. The amplifier injects a first-order pump beam and a second order pump beam into the transmission line. The article "Third-Order Cascaded Raman Amplification" by S. B. Papernyi et al, post-deadline digest OFC 2002, p. FB4, describes a third-order Raman amplifier with a pump that delivers a pump beam detuned by three Stokes shifts from the signal beam, which is injected in counter-propagating direction into the transmission line. The amplifier requires only a single active pump source while two Bragg fiber gratings are used to create the lower-order "seed" wavelengths from amplified spontaneous emission (ASE). Higher-order (i.e., second- or third-order) Raman amplifier systems have compared to first-order Raman amplifiers reduced noise, longer fiber span lengths, and reduced nonlinearities.

Additionally, transmission systems require next to amplification also dispersion compensation since optical signals propagating along an optical fiber are subject to chromatic dispersion. Dispersion compensation is typically achieved by the use of dispersion compensating fibers (DCF), i.e., optical fibers with a negative refractive index at the wavelength spectrum of the signal beam. DFCs are in turn a source of signal attenuation and thus require signal amplification. It would equally be possible to use the DCF itself as a Raman gain medium but which would require another Raman pump for the DFC gain. A complete system would thus require a second-order Raman amplifier for amplification in the transmission line and a separate Raman amplifier for the DCF gain.

It is therefore an object of the present invention to provide a Raman amplifier with improved noise characteristic which is well suited for use in an optical fiber communication system with dispersion compensation.

SUMMARY OF THE INVENTION

These and other objects that appear below are achieved by a Raman amplifier having a first order pump source and a second order pump source both coupled to the input ports of a four-port optical coupler having two input ports and two output ports. One output port being connectable to an optical fiber link to inject a pump light signal into the fiber link for second-order Raman amplification and the other output port being connectable to a dispersion compensative fiber. The coupler can be a fused fiber coupler with a coupling ratio of 80/20 or 90/10, for example.

This allows a higher amplification than a first-order Raman amplifier, and a lower noise figure and combines the advantages of second-order Raman pumping in the transmission line and DCF Raman pumping with only the same amount of active components than a "classical" second-order Raman amplifier.

BRIEF DESCRIPTION OF THE DRAWINGS

A preferred embodiment of the present invention will now be described with reference to the accompanying drawings in which.

DETAILED DESCRIPTION OF PREFERRED EMBODIMENTS

Figure 1:
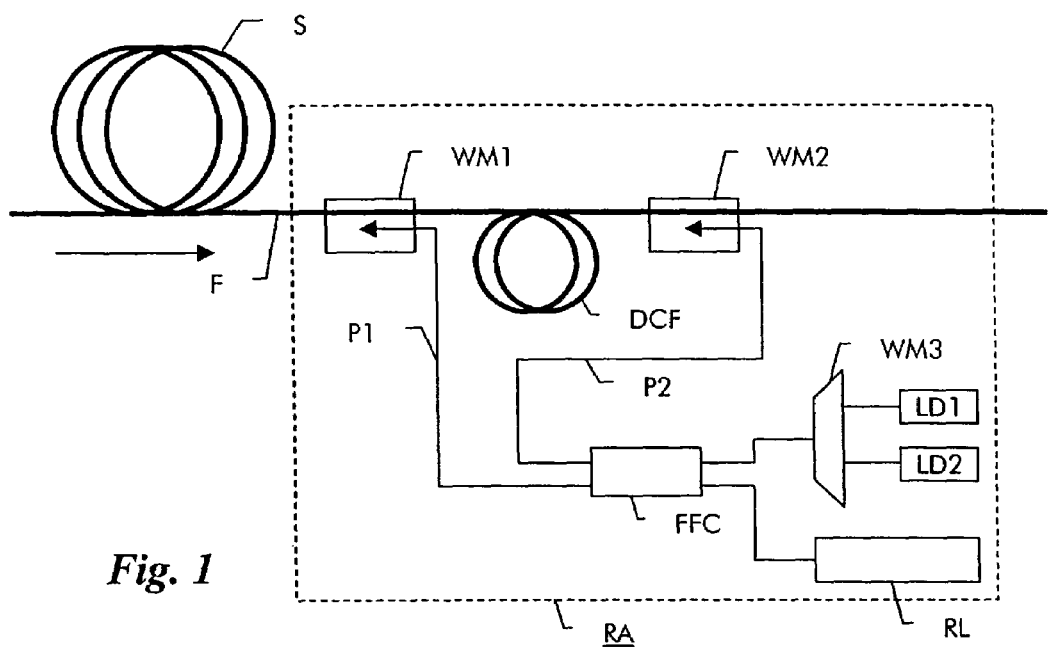
FIG. 1 shows a Raman amplifier according to the invention and FIG. 2 shows in diagram the Raman gain over the wavelength spectrum.

A Raman amplifier RA according to the invention is shown in FIG. 1. The amplifier is connected to a fiber link F in order to amplify an optical signal traversing the fiber.

The fiber in the preferred embodiment is a standard single mode fiber (SMF). The preceding fiber length S serves as amplifying medium for amplification by stimulated Raman scattering. Therefore, pump light is fed in reverse direction into the fiber F. In addition, a dispersion compensating fiber DCF is connected to the fiber link F in order to compensate for signal distortion due to chromatic dispersion of the preceding fiber span S. The DCF is also used as amplifying medium for Raman amplification to balance insertion loss of the DCF.

According to the invention, the preceding fiber span S is used for second order Raman amplification while the DCF is basically used for ordinary first order Raman amplification. The basic idea of the invention is to use a first order pump source LD1, LD2 for pumping the DCF as well as seed wavelength for the second order pump for the fiber link. This is achieved by the use of a four-port coupler FFC, which may be a fused fiber coupler, for instance.

A high-power Raman laser RL, detuned by two Raman shifts from the signal wavelength, is used as second order pump source. Two lower power laser diodes LD1, LD2, which outputs are combined by a wavelength multiplexer WM3, serve as first-order pump for the DCF. First order pump source LD1, LD2 and second order pump source RL are connected to the two inputs of the fused fiber coupler FFC, which first output is injected via a first wavelength multiplexer WM1 in reverse direction into the fiber F and which second output is injected via a second wavelength multiplexer WM2 into the DCF.

The fused fiber coupler has in the preferred embodiment a coupling ratio of 80:20, which means that 80% of the second order pump light from Raman laser RL is injected into fiber F while only 20% thereof is injected into the DCF. Conversely, 80% of the first-order pump light from laser diodes LD1 and LD2 is injected into the DCF while only 20% in injected into fiber F where it serves as seed wavelength for second order Roman amplification.

In the embodiment, Raman laser RL has an output power of 1 W at a wavelength of 1368 nm. Laser diodes LD1 and LD2 emit at wavelengths of 1460 nm and 1427 nm, respectively, and have a combined output power of 300 mW. The combined pump light injected into fiber F is therefore 800 mW at 1368 nm and 60 mW at 14xx nm. Conversely, the pump light injected into the DCF is 240 mW at 14xx nm and 200 mW at 1368 nm.

Figure 2:
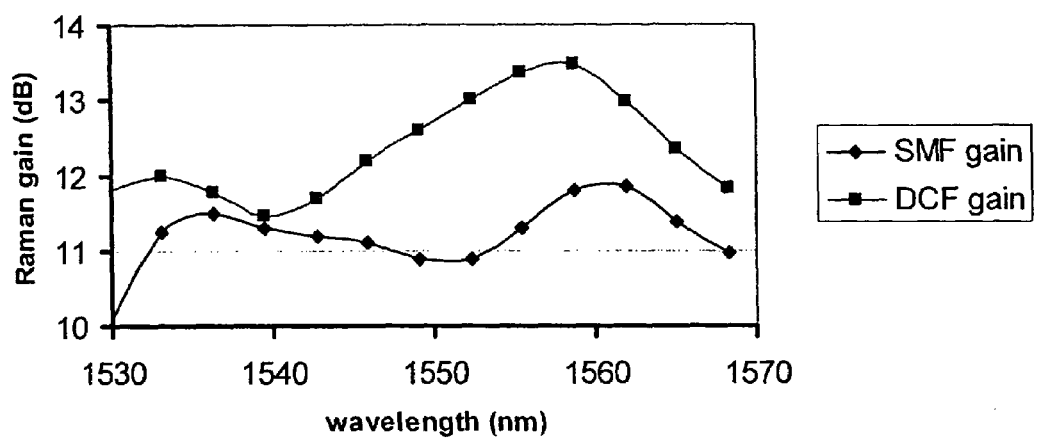

FIG. 2 shows the Raman gain curve over the entire useable signal spectrum between 1530 nm and 1570 nm. The upper curve represents the DCF gain, i.e., the gain obtained in the DCF by first order Roman pumping and the lower curve is the gain obtained from second order Raman pumping in the single mode fiber (SMF), i.e., in the preceding fiber span S. The total gain is thus the combined gain of both (not shown). The total gain has a very flat course in the range between 22 dB and 25 dB. The use of more than only two first order pump wavelength would lead to an even flatter gain curve if required.

The invention allows to realize second order Raman pumping in the transmission line together with DCF Raman pumping and requires only the same number of component than a known second order Raman pumps. With the invention a high Ramon gain of about 20 dB or more can be obtained since a powerful Raman laser can be used. Such large Raman gain would be very difficult to achieve with only first order 14xxlaser diodes due to the limited output power of laser diodes (max. 400 mW). The invention is well suited for use in Ultra Long Haul transmission and in future 40G systems.

While the invention has been explained in a preferred embodiment, it should be clear to those skilled in the art that the invention is not restricted to the particular details and figures given there. Conversely, those skilled in the art will appreciate that various modifications and substitutions would be possible without departing from the concepts of the invention. For example, those skilled in the art would know, that the first order Ramon pump can have more or less laser diodes than the two shown in the embodiment or other pump light sources operating at different wavelengths to obtain a smooth and broad gain curve. Equally, any other known light source that emits at the required wavelength provide sufficient pump power may be used as second order Raman pump. The four-port coupler can be implemented with other components, including silica-on-silicon technology or semiconductor waveguides, and can have other coupling ratios, such as 90:10, for example.

The DCF can be integral part of the Raman amplifier but can more preferably be an external component so that the DCF length can easily be adapted to the required compensation value. Moreover, rather than a DCF, an ordinary fiber can be used when for example no dispersion compensation is required but a flat gain curve and high Raman gain as provided by the invention is wanted.

The Raman amplifier can be a distributed amplifier using a deployed fiber as in the embodiment or can also be a lumped amplifier having a dedicated fiber as amplifying medium not deployed in the field.

What is claimed is:

1. A Raman amplifier comprising:
 a second order Raman pump source configured to generate a second order Raman pump light amplifying a signal beam propagating along a first optical fiber length by second order Raman amplification;
 a first order Raman pump source configured to generate first order Raman pump light which amplifies said signal beam propagating along a second optical fiber length by first order Raman amplification; and
 a four-port optical coupler which is connected to said second-order Raman pump source and said first-order Raman pump source, said four-port optical coupler being configured to mix a smaller signal fraction of said first order pump signal and a larger fraction of said second order pump signal to generate a first output pump signal which is inserted into said first fiber length and to mix a larger signal fraction of said first order pump signal and a smaller fraction of said second order pump signal to generate a second output pump signal which is inserted into said second fiber length.

2. A Raman amplifier according to claim 1, wherein said coupler is a fused fiber coupler.

3. A Raman amplifier according to claim 1, wherein said second order Raman pump source has a substantially higher output power than said first order Raman pump source.

4. A Raman amplifier according to claim 1, wherein said second fiber length is a dispersion compensating fiber.

5. A Raman amplifier according to claim 1, wherein said coupler has a coupling ratio in the range between 80:20 and 90:10.

6. A Raman amplifier according to claim 1, wherein said first order Raman pump source comprises two or more laser diodes emitting at slightly different wavelengths.

7. A Raman amplifier according to claim 1, wherein said second order Raman pump source is Raman laser.

\* \* \* \* \*